(12) United States Patent
Lu et al.

(10) Patent No.: US 9,501,678 B2
(45) Date of Patent: *Nov. 22, 2016

(54) INDICIA READING TERMINAL INCLUDING OPTICAL FILTER

(71) Applicant: Honeywell International, Inc., Morris Plains, NJ (US)

(72) Inventors: Reck Lu, Suzhou (CN); Xiaoxun Zhu, Marlton, NJ (US)

(73) Assignee: Honeywell Internations, Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,371

(22) Filed: Mar. 21, 2016

(65) Prior Publication Data

US 2016/0203351 A1     Jul. 14, 2016

Related U.S. Application Data

(63) Continuation of application No. 14/166,103, filed on Jan. 28, 2014, now Pat. No. 9,292,723, which is a continuation of application No. 13/057,236, filed as application No. PCT/CN2010/000089 on Jan. 21, 2010, now Pat. No. 8,640,958.

(51) Int. Cl.
    *G06K 7/12*         (2006.01)
    *G06K 7/10*         (2006.01)
    *G06K 19/06*      (2006.01)

(52) U.S. Cl.
    CPC .............. *G06K 7/12* (2013.01); *G06K 7/10732* (2013.01); *G06K 19/0614* (2013.01)

(58) Field of Classification Search
    CPC ............... G06K 7/10732; G06K 7/12; G06K 7/10831; G06K 19/0614
See application file for complete search history.

(56) References Cited

U.S. PATENT DOCUMENTS 5,019,699 A     5/1991     Koenck
5,406,062 A     4/1995     Hasegawa et al.
(Continued)

FOREIGN PATENT DOCUMENTS

CA     2375577 A1     9/2003
CN     1458618 A     11/2003
(Continued)

OTHER PUBLICATIONS

International Search Report and Written Opinion of the International Searching Authority, Applicant, Metrologic Instruments, Inc. et al., mailed Nov. 4, 2010, 12 pages. Previously submitted in Parent Application.

(Continued)

*Primary Examiner* — Kristy A Haupt
(74) *Attorney, Agent, or Firm* — Additon, Higgins & Pendleton, P.A.

(57) ABSTRACT

Embodiments of the present invention comprise an indicia reading terminal that is operatively configured to decode visible and non-visible decodable indicia. The terminal can comprise an excitation illumination module for illuminating the decodable indicia with light that has a wavelength selected so as to permit the decodable indicia to emit light. The terminal can also comprise a filter module with an optical filter that has filter regions configured to pass certain wavelengths of light. The terminal can also comprise an image sensor module with an image sensor located so as to receive light emitted from the decodable indicia from the filter region.

26 Claims, 6 Drawing Sheets

(56) References Cited

U.S. PATENT DOCUMENTS

| | | | |
|---|---|---|---|
| 5,504,367 A | 4/1996 | Arackellian et al. |
| 5,541,419 A | 7/1996 | Arackellian |
| 5,572,006 A | 11/1996 | Wang et al. |
| 5,576,529 A | 11/1996 | Koenck et al. |
| 5,591,955 A | 1/1997 | Laser |
| 5,627,359 A | 5/1997 | Amundsen et al. |
| 5,646,390 A | 7/1997 | Wang et al. |
| 5,648,650 A | 7/1997 | Sugifune et al. |
| 5,701,001 A | 12/1997 | Sugifune et al. |
| 5,756,981 A | 5/1998 | Roustaei et al. |
| 5,784,102 A | 7/1998 | Hussey et al. |
| 5,815,200 A | 9/1998 | Ju et al. |
| 5,877,487 A | 3/1999 | Tani et al. |
| 5,886,338 A | 3/1999 | Arackellian et al. |
| 6,010,070 A | 1/2000 | Mizuochi et al. |
| 6,230,975 B1 | 5/2001 | Colley et al. |
| 6,254,003 B1 | 7/2001 | Pettinelli et al. |
| 6,283,374 B1 | 9/2001 | Fantone et al. |
| 6,347,163 B2 | 2/2002 | Roustaei |
| 6,412,700 B1 | 7/2002 | Blake et al. |
| 6,669,093 B1 | 12/2003 | Meyerson et al. |
| 6,695,209 B1 | 2/2004 | La |
| 6,749,120 B2 | 6/2004 | Hung et al. |
| 6,832,725 B2 | 12/2004 | Gardiner et al. |
| 6,877,661 B2 | 4/2005 | Webb et al. |
| 7,028,904 B2 | 4/2006 | Schmidt et al. |
| 7,061,395 B1 | 6/2006 | Bromer |
| 7,077,321 B2 | 7/2006 | Longacre, Jr. et al. |
| 7,083,097 B2 | 8/2006 | Toyama et al. |
| 7,083,098 B2 | 8/2006 | Joseph et al. |
| 7,185,817 B2 | 3/2007 | Zhu et al. |
| 7,219,843 B2 | 5/2007 | Havens et al. |
| 7,234,641 B2 | 6/2007 | Olmstead |
| 7,240,844 B2 | 7/2007 | Zhu et al. |
| 7,255,279 B2 | 8/2007 | Zhu et al. |
| 7,270,274 B2 | 9/2007 | Hennick et al. |
| 7,303,126 B2 | 12/2007 | Patel et al. |
| 7,308,375 B2 | 12/2007 | Jensen et al. |
| 7,320,431 B2 | 1/2008 | Zhu et al. |
| 7,336,197 B2 | 2/2008 | Ding et al. |
| 7,357,326 B2 | 4/2008 | Hattersley et al. |
| 7,387,250 B2 | 6/2008 | Muni |
| 7,398,927 B2 | 7/2008 | Olmstead et al. |
| 7,490,778 B2 | 2/2009 | Zhu et al. |
| 7,503,499 B2 | 3/2009 | Zhu et al. |
| 7,513,430 B2 | 4/2009 | Zhu et al. |
| 7,516,899 B2 | 4/2009 | Laser |
| 7,527,207 B2 | 5/2009 | Acosta et al. |
| 7,533,824 B2 | 5/2009 | Hennick et al. |
| 7,564,548 B2 | 7/2009 | Flanders et al. |
| 7,568,628 B2 | 8/2009 | Wang et al. |
| 7,611,060 B2 | 11/2009 | Wang et al. |
| 7,656,556 B2 | 2/2010 | Wang |
| 7,693,744 B2 | 4/2010 | Forbes |
| 7,735,737 B2 | 6/2010 | Kotlarsky et al. |
| 7,762,464 B2 | 7/2010 | Goren et al. |
| 7,770,799 B2 | 8/2010 | Wang |
| 7,775,436 B2 | 8/2010 | Knowles |
| 7,780,089 B2 | 8/2010 | Wang |
| 7,809,407 B2 | 10/2010 | Oshima et al. |
| 7,810,720 B2 | 10/2010 | Lovett |
| 7,813,047 B2 | 10/2010 | Wang et al. |
| 7,909,257 B2 | 3/2011 | Wang et al. |
| 7,913,912 B2 | 3/2011 | Do et al. |
| 7,918,398 B2 | 4/2011 | Li et al. |
| 7,967,211 B2 | 6/2011 | Challa et al. |
| 7,995,178 B2 | 8/2011 | Suguro et al. |
| 8,074,887 B2 | 12/2011 | Havens et al. |
| 8,143,565 B2 | 3/2012 | Berkner et al. |
| 8,640,958 B2 | 2/2014 | Lu et al. |
| 9,292,723 B2* | 3/2016 | Lu .............................. G06K 7/12 |
| 2001/0027995 A1 | 10/2001 | Patel et al. |
| 2003/0062413 A1 | 4/2003 | Gardiner et al. |
| 2003/0222147 A1 | 12/2003 | Havens et al. |
| 2004/0020990 A1 | 2/2004 | Havens et al. |
| 2004/0164165 A1 | 8/2004 | Havens et al. |
| 2005/0001035 A1 | 1/2005 | Hawley et al. |
| 2005/0023356 A1 | 2/2005 | Wiklof et al. |
| 2005/0103854 A1 | 5/2005 | Zhu et al. |
| 2005/0139681 A1 | 6/2005 | Premjeyanth et al. |
| 2005/0279836 A1 | 12/2005 | Havens et al. |
| 2006/0011724 A1 | 1/2006 | Joseph et al. |
| 2006/0043194 A1 | 3/2006 | Barkan et al. |
| 2006/0049261 A1 | 3/2006 | Stadtler |
| 2006/0087572 A1 | 4/2006 | Schroeder |
| 2006/0113386 A1 | 6/2006 | Olmstead |
| 2006/0138234 A1 | 6/2006 | Joseph et al. |
| 2006/0145057 A1 | 7/2006 | Kim |
| 2006/0163355 A1 | 7/2006 | Olmstead et al. |
| 2006/0202036 A1 | 9/2006 | Wang et al. |
| 2006/0274171 A1 | 12/2006 | Wang |
| 2007/0138293 A1 | 6/2007 | Zhu et al. |
| 2007/0181692 A1 | 8/2007 | Barkan et al. |
| 2007/0205288 A1 | 9/2007 | Laser |
| 2007/0284447 A1 | 12/2007 | McQueen |
| 2008/0023556 A1 | 1/2008 | Vinogradov et al. |
| 2008/0223933 A1 | 9/2008 | Smith |
| 2008/0252066 A1 | 10/2008 | Rapoport et al. |
| 2008/0277476 A1 | 11/2008 | Kotlarsky et al. |
| 2009/0026267 A1 | 1/2009 | Wang et al. |
| 2009/0057413 A1 | 3/2009 | Vinogradov et al. |
| 2009/0072038 A1 | 3/2009 | Li et al. |
| 2009/0140050 A1 | 6/2009 | Liu et al. |
| 2009/0159686 A1 | 6/2009 | Taylor et al. |
| 2010/0044436 A1 | 2/2010 | Powell et al. |
| 2010/0044440 A1 | 2/2010 | Wang et al. |
| 2010/0078477 A1 | 4/2010 | Wang et al. |
| 2010/0078482 A1 | 4/2010 | Bradford |
| 2010/0108769 A1 | 5/2010 | Wang et al. |
| 2010/0147956 A1 | 6/2010 | Wang et al. |
| 2010/0155483 A1 | 6/2010 | Craig et al. |
| 2011/0084143 A1 | 4/2011 | Liou |
| 2011/0163165 A1 | 7/2011 | Liu et al. |
| 2011/0174880 A1 | 7/2011 | Li et al. |
| 2012/0000982 A1 | 1/2012 | Gao et al. |
| 2012/0111944 A1 | 5/2012 | Gao et al. |
| 2012/0138684 A1 | 6/2012 | Van Volkinburg et al. |
| 2012/0153022 A1 | 6/2012 | Havens et al. |
| 2012/0193429 A1 | 8/2012 | Van Volkinburg et al. |
| 2012/0325911 A1 | 12/2012 | Ding et al. |
| 2012/0325912 A1 | 12/2012 | Wang et al. |

FOREIGN PATENT DOCUMENTS

| | | |
|---|---|---|
| CN | 101477617 A | 7/2009 |
| CN | 102203800 A | 9/2011 |
| JP | 8055177 A | 2/1996 |
| WO | 2006071467 A2 | 7/2006 |
| WO | 2011088590 A2 | 7/2011 |

OTHER PUBLICATIONS

Chinese Office Action and Search Report in CN Application No. 201080002497.0, dated Jun. 30, 2014, Original and English translation provided. 19 pages.

Second Chinese Office Action in related Chinese Application No. 201080002497.0, Dated Feb. 28, 2015, Translation included, 15 pages.

* cited by examiner

INDICIA READING TERMINAL INCLUDING OPTICAL FILTER

CROSS-REFERENCE TO RELATED APPLICATIONS

The present application claims the benefit of U.S. Patent Application No. 14/166,103 for an Indicia Reading Terminal Including Optical Filter filed Jan. 28, 2014 (and published Oct. 23, 2014 as U.S. Patent Publication No. 2014/0312121), now U.S. Pat. No. 9,292,723, which claims the benefit of U.S. patent application Ser. No. 13/057,236 for an Indicia Reading Terminal Including Optical Filter filed Aug. 10, 2012 (and published Nov. 29, 2012 as U.S. Patent Publication No. 2012/0298755), now U.S. Pat. No. 8,640,958, which itself claims the benefit of International Application No. PCT/CN2010/000089 for an Indicia Reading Terminal Including Optical Filter filed Jan. 21, 2010 (and published Jul. 28, 2011 as WIPO Publication No. WO 2011/088590). Each of the foregoing patent applications, patent publications, and patents is hereby incorporated by reference in its entirety.

FIELD OF THE INVENTION

The present invention relates to indicia reading terminals, and more particularly, to indicia reading terminals operatively configured to decode decodable indicia printed with material responsive to both visible and non-visible (e.g., ultraviolet ("UV")) light.

BACKGROUND

Indicia reading terminals are available in multiple varieties. Well-known among the varieties is the gun style terminal as commonly seen at retail store checkout counters. Other terminals are also available that provide enhanced functions, have keyboards, and displays, and include advanced networking communication capabilities. Many indicia reading terminals also have triggers for activating decoding attempts.

Typically indicia reading terminals are implemented to decode decodable indicia that are readily visible. Advances in security and similar precautionary protocols tend, however, to utilize decodable indicia that are only visible in the presences of non-visible light such as UV light. These non-visible indicia are often printed with materials such as ink so that to the naked eye the indicia do not appear to be present on the document, package, or device.

Known devices used to decode non-visible indicia comprise UV fluorescent illuminating devices which emit UV illumination. Short wavelength diodes have been used, for example, to emit light in the deep blue to near UV region of the spectrum, and can be used to produce illumination compatible with the non-visible indicia. These devices are somewhat limited in their application, however, because although they can illuminate the non-visible indicia, actual decoding of the indicia is particularly sensitive to the position, orientation, and other physical alignment between the devices and the illuminated non-visible indicia.

There is a need, therefore, for an indicia reading terminal that can decode both visible and non-visible decodable indicia, and in one example there is a need for such terminal that can decode these types of indicia without substantial reduction in the depth of field of the terminal.

SUMMARY

There is described below embodiments of an indicia reading terminal that can be operative to decode visible and non-visible decodable indicia. Some embodiments comprise an excitation illumination module, a filter module, and an image sensor module, all of which are configured to permit the indicia reading terminal to decode non-visible decodable indicia at distances greater than the distances of those devices discussed in the Background above.

Some of the concepts and features of the present invention are discussed in more detail below, wherein:

In one embodiment, there is provided an indicia imaging unit for imaging a decodable indicia comprising a printing material. The indicia imaging unit can comprise an excitation illumination module that comprises an illumination source for casting light onto the decodable indicia. The indicia imaging unit can also comprise an image sensor module responsive to the emitted light from the decodable indicia, and a filter module receiving the reflected light before the image sensor module. The filter module can comprise at least one optical filter having a pass-band matching the emission wavelength of the emitted light. In one example, the illumination source is operatively configured to provide the light at a wavelength that causes the printing material to emit light at an emission wavelength visible to the human eye.

In another embodiment, there is provided an indicia reading terminal for imaging decodable indicia comprising a printed material visible in response to light in a non-visible spectrum. The terminal can comprise an illumination source for casting light onto the decodable indicia, the light having a wavelength in the non-visible spectrum, the wavelength causing light emitted from the printing material having an emission wavelength in a visible spectrum. The terminal can also comprise an optical filter receiving the emitted light, the optical filter can comprise a filter region having a pass-band matching the emission wavelength. The terminal can further comprise an image sensor responsive to the emission wavelength in a manner permitting decoding of the decodable indicia, the image sensor can comprise a plurality of pixels including one or more of a first subset of monochrome pixels and a second subset of color pixels. The terminal can also comprise a hand held housing in surrounding relation to one or more of the illumination source, the image sensor, and the optical filter. In one example, the image sensor defines an optical axis on which is aligned the filter region of the optical filter, wherein said hand held terminal is operative for manual activation by a trigger depressed by an operator. In another example, the trigger causes at least one attempt to decode the decodable indicia. In yet another example, the handheld terminal is operative to assign one or more of the pass-band of the optical filter and the wavelength of the light generated by the illumination source based the attempt to decode the decodable indicia.

In yet another embodiment, there is provided a method of decoding decodable indicia comprising a printed material visible in response to light in a non-visible spectrum. The method can comprises the step of aligning on an optical axis an image sensor and an optical filter, the optical filter comprising at least one filter region having a pass-band for passing an emission wavelength of light emitted by the printing material. The method can also comprise the step of generating light from an illumination source, the light having a wavelength in the non-visible spectrum. The method can further comprise the step of setting one or more of the wavelength of the light for illuminating the decodable indicia and the pass-band for the optical filter by correlating each of the wavelength and the pass-band to a successful decode of the decodable indicia.

BRIEF DESCRIPTION OF THE DRAWINGS

So that the manner in which the above recited features of the present invention can be understood in detail, a more particular description of the invention briefly summarized above, may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Moreover, the drawings are not necessarily to scale, emphasis generally being placed upon illustrating the principles of certain embodiments of invention.

Thus, for further understanding of the concepts of the invention, reference can be made to the following detailed description, read in connection with the drawings in which.

DETAILED DESCRIPTION

In accordance with its major aspects, and broadly stated, the present invention comprises concepts that improve the performance of indicia reading terminals such as by adapting such terminals to illuminate, image, and decode a decodable indicia printed with, e.g., ultraviolet florescent inks. There is provided in the discussion below, for example, embodiments of an indicia reading terminal that comprise an excitation illumination module for illuminating the indicia, a filter module for filtering light reflected from the indicia, and an image sensor module for receiving light from the filter module. These modules can be incorporated into an image module as seen in the exemplary image module of FIGS. 4 and 5 below. This configuration, as well as the combination of the modules as a functional indicia imaging unit is beneficial because the inventors have found that implementing these concepts as part of the indicia reading terminal adapts the terminal for robust decoding of "invisible" decodable indicia without substantial degradation of the terminal's other operating characteristics, e.g., the depth of field, and the focal length. Moreover, in addition to maintaining these operating characteristics while expanding the range of applications, such terminals can significantly improve the quality of images captured from the invisible indicia, and in one example the improvement is seen in the clarity or "snappiness" of the images generated by the terminal. The term "invisible" as used herein is generally meant to identify decodable indicia that can be viewed with the human eye when aided by certain excitation illumination, details of which are discussed throughout the disclosure below.

Figure 1:
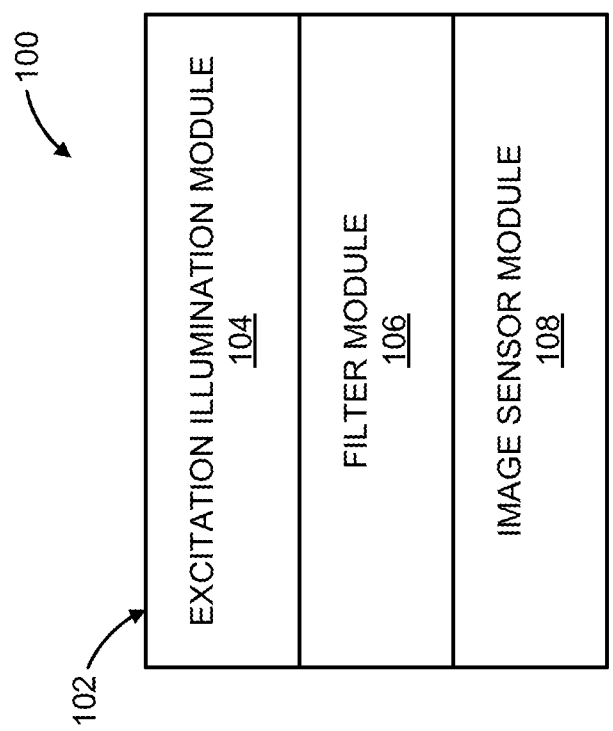
FIG. 1 is a functional block diagram illustrating an embodiment of an indicia reading terminal.

To illustrate some of these concepts reference can be had to an indicia reading terminal 100 that is illustrated in the functional block diagram of FIG. 1. Here it is seen that the indicia reading terminal 100 can comprise an indicia imaging unit 102 with an excitation illumination module 104, a filter module 106, and an image sensor module 108. Other components of the indicia reading terminal 100 will be discussed in more detail below, such as, for example, in connection with the various embodiments of image modules and terminals that are shown in FIGS. 4-7. Before getting to those more detailed examples, however, some of the features, functions, and aspects of the modules in the indicia imaging unit 102 will be described immediately below.

For example, it was mentioned briefly above that the excitation illumination module 104 can be used to cast illumination onto the decodable indicia. This illumination can originate from an excitation illumination light source that generates light, which as the term "light" is used herein means those electromagnetic wavelengths in the visible and non-visible spectrum. An example of these electromagnetic wavelengths can include UV light, infra-red ("IR") light, other non-visible light, as well as other light selected based on the properties of the printing material used to create the decodable indicia. These printing materials can comprise inks such as inks that, while not visible to the human eye, emit light when excited by the excitation illumination light source. These inks are generally well-known and one skilled in the indicia reading arts will be readily able to understand the properties of the printing materials for use in printing the decodable indicia.

Light from the excitation illumination light source that is compatible with the printing materials can emanate from light sources that comprise one or more light emitting diodes ("LEDs"). These LEDs can comprise LEDs of a single color (e.g., UV LEDs), or they can comprise differently colored LEDs, the light from which can be combined to so that the overall color emitted by the light source can be controlled and varied. In other embodiments, some examples of which are described in more detail below, the excitation illumination light source can be operatively configured to generate laser light such as can be done with LEDs and/or laser diodes.

The inventors have discovered that although light from traditional techniques such as "black-light" techniques (that utilize UV light) could be used to illuminate certain types of printing materials, this illumination does not generally permit the indicia reading terminal 100 to generate consistent good decodes of the corresponding decodable indicia over a substantially larger depth of field. Indeed the use of UV light, IR light, and light of similar wavelength and/or frequency to illuminate the decodable indicia can limit the operating characteristics of the terminals because the terminal oftentimes has to be placed in very near proximity to the decodable indicia. That is, in one example, whereas terminals that generally implement UV light and UV-type light can only decode decodable indicia printed with invisible printing materials when in contact with the decodable indicia, terminals such as the indicia reading terminal 100 of the present invention can decode these same (or similar) decodable indicia at distances of more than 20 cm away from the terminal.

One aspect of the present invention that helps to overcome this deficiency is that the indicia reading terminal 100 incorporates the filter module 106. The filter module 106 can be provided in some embodiments of the indicia reading terminal 100 with an optical filter that is constructed with certain pass-bands that match the emission wavelengths of the light emitted by the printing material. While these pass-bands can be configured to pass light that has a wide range of wavelengths, it is contemplated that the optical filter in certain embodiments of the indicia reading terminal 100 will comprise pass-bands that permit the light emitted by the printing material to pass to, e.g., the image sensor module 108, but that effectively blocks all other wavelengths in the visible and invisible ranges. By way of non-limiting example, the optical filters of the filter module 106 can be positioned between the decodable indicia and the image sensor module 108 so that light emitted by (or reflected from) the decodable indicia must pass through the optical filter before it reaches the image sensor module 108. This position, when combined with construction of the optical filter that is based on the particular light source and/or the printing materials of the decodable indicia, can permit the indicia reading terminal 100 to decode the decodable indicia. This feature is beneficial because it permits the indicia reading terminal 100 to be located in spaced relation to the decodable indicia without degradation of its ability to achieve consistent good decodes of the decodable indicia.

Figure 2:
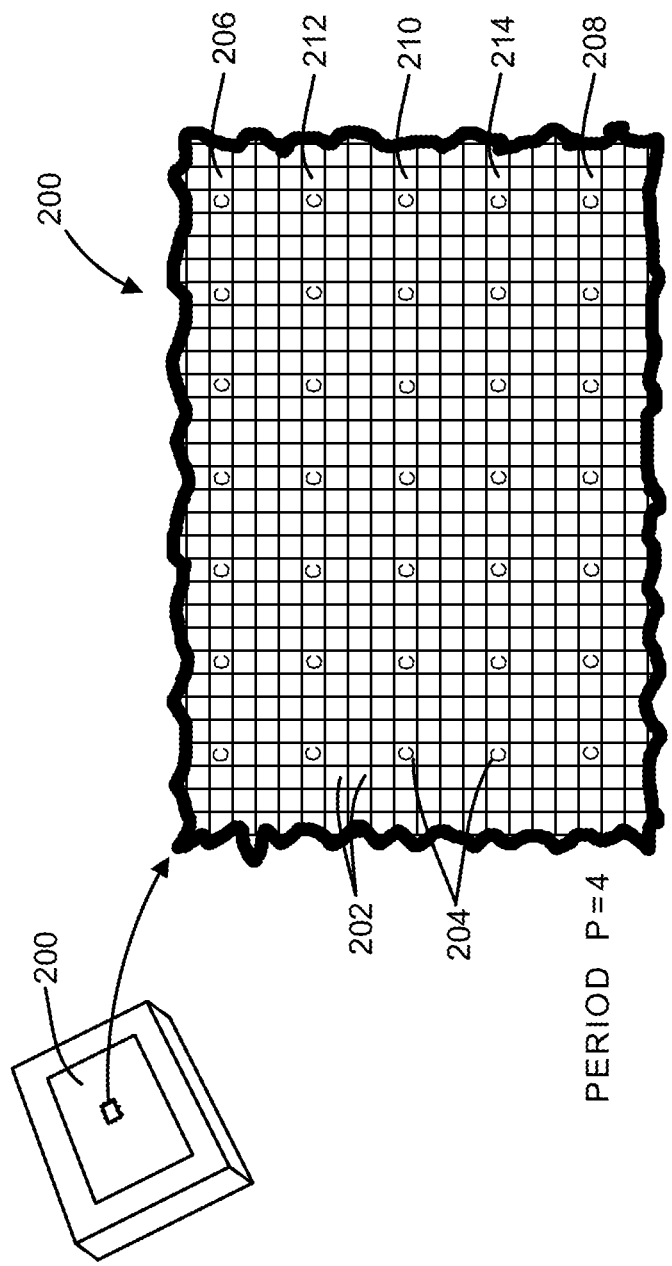
FIG. 2 is a diagram illustrating an exemplary hybrid monochrome and color image sensor pixel array having a first subset of monochrome pixels and a second subset of color pixels.

Continuing with the discussion of FIG. 1, and also with reference now to FIG. 2, the image sensor module 108 (FIG. 1) can comprise an image sensor and optics assembly, which is operatively configured to focus the light onto the image sensor. The image sensor can comprise color or monochrome 1D or 2D charge coupled devices ("CCD"), semiconductor devices (e.g., CMOS, NMOS, and PMOS), and other solid state image sensors with properties and characteristics useful for capturing and processing image data, such as image data of a decodable indicia. An example of an image sensor of the type used as the image sensor in the image sensor module 108 is illustrated in FIG. 2. There is provided in FIG. 2 a hybrid monochrome and color image sensor pixel array 200 for an imaging terminal (e.g., the indicia reading terminal 100 (FIG. 1)). The color image sensor pixel array 200 can include pixels arranged in a plurality of rows of pixels and can include a first subset of monochrome pixels 202 devoid of color filter elements and a second subset of color pixels 204 including color filter elements. Such color sensitive pixels can be disposed at spaced apart positions of the color image sensor pixel array 200 and can be disposed at positions uniformly or substantially uniformly throughout the color image sensor pixel array 200.

In one embodiment, the spaced apart color pixels of the image sensor array, though spaced apart can follow a pattern according to a Bayer pattern. For example, where Red=R, Green=G, and Blue=B, the color pixels shown in row 206 can have the pattern . . . GRGRGRG . . . which pattern can be repeated for rows 208 and 210. The pixels of row 212 can have the pattern . . . BGBGBGB . . . , which pattern can be repeated for row 214. The patterns described with reference to rows 206, 212, 210, 214, 208 can be repeated throughout color image sensor pixel array 200. Alternatively, different patterns for the color pixels may be used in accordance with concepts of the invention. A color frame of image data captured with use of a color image sensor pixel array 200 having both color and monochrome pixels can include monochrome pixel image data and color pixel image data. The image sensor of the image sensor module 108 (FIG. 1) can be packaged in an image sensor integrated circuit as shown in FIG. 2. Various additional features that can be utilized with indicia reading terminal 100 (FIG. 1) are disclosed in U. S. patent application Ser. No. 11/174,447 entitled, Digital Picture Taking Optical Reader Having Hybrid Monochrome And Color Image Sensor Array, filed Jun. 30, 2005, incorporated herein by reference.

The majority of pixels of the image sensor array can be monochrome pixels of the first subset. Color sensitive pixels of the second subset are at spaced apart positions and can be uniformly or substantially uniformly distributed throughout the image sensor array. Color sensitive pixels may be distributed in the array in a specific pattern of uniform distribution such as a period of P=4 where, for every fourth row of pixels of the array, every fourth pixel is a color sensitive pixel as shown in FIG. 2. Alternatively, other distributions may be used such as a period of P=2, where every other pixel of every other row of the image sensor array is a color sensitive pixel.

Referring back to FIG. 1, and continuing the discussion of some other concepts and components of the indicia imaging unit 102 in more detail, the excitation illumination light sources of the excitation illumination module 104 can comprise a plurality light sources (not shown). Some of these light sources can be useful to provide an aiming pattern for optimizing the position of the indicia imaging unit 102 with respect to the decodable indicia. To facility image acquisition, the illumination sources can utilize an aiming pattern generating device that can be operatively configured to project the aiming pattern in the form of a user-visible alignment indicator that assists in optimizing the spatial relationship between the image engine and the decodable indicia on the target. For example, using one or more light emitting devices (e.g., LEDs), examples of which are provided immediately below, in conjunction with the appropriate or desired aiming pattern generating device, the user may see patterns such as cross-hairs, corner brackets, one or more dots, a line, or combination of these, projected on the target bearing the decodable indicia. These patterns can provide visual feedback to the user to assist in placing the indicia imaging unit 102 and the target indicia into an acceptable reading position relative to each other.

Although a variety of techniques can be used, in one example the light source can be provided by one or more LEDs. These LEDs can be positioned so that the light generated by the LEDs is directed in a preferred orientation (e.g., substantially perpendicular) with respect to the indicia imaging unit 102, indicia reading terminal 100, and/or other surface(s) of, e.g., a substrate such as a printed circuit board or semiconductor device, both of which are suited to have the LEDs affixed thereon. An opening or aperture can generally be provided such as in an optical plate (e.g., optical plate 420 (FIG. 4)) so as to permit the light beam to exit the indicia imaging unit 102. This aperture can be sized, shaped, and configured such as in the form of a slit, annular feature, square, rectangle, and a plurality of holes, all of which can influence the shape of the aiming pattern that is generated on the target.

Discussing now some additional features of the excitation illumination module 104 and/or excitation illumination light sources, it is contemplated that the devices such as LEDs that are used as one or more of the light sources are operatively configured to provide substantially uniform illumination of the target. In the case of acquisition illumination, the illumination light source is projected towards the target, such as a bar code indicia on the target, and the resulting scattering light from the target passes through the optics of the indicia imaging unit 102 such as, for example, optics and optical layers positioned relative to the image sensor module 108. The light can impinge on the responsive portion of the image sensor module 108. While conventional data collection devices that image decodable indicia visible to the human eye employ visible light, and primarily white, red, blue, and/or green for targeting and image acquisition illumination, this is not a requirement. That is, depending on the environment of use and overall module capabilities, other wavelengths or portions of the spectrum may be used as well.

It is further noted that the amount of light, both ambient and that generated by the indicia reading terminal 100, can be an important factor in the performance of the indicia reading terminal 100 and indicia imaging unit 102. With regard to light generated by the indicia reading terminal 100, the amount of light and the amount of power required to produce it are factors in whether an image can be acquired at all (for example, under low light and/or long range conditions); in the time needed to acquire the image (for example, higher illumination can improve contrast levels, decreasing the time needed to recognize and/or acquire an image, or conversely can produce glare or specular reflection, impairing image detection and acquisition); in the quality of the image acquired; in whether it is necessary or desirable to alternate or combine the use of aiming illumination and acquisition illumination sources; and, in the case of a battery-powered device, in balancing power conservation with performance. When reading 2D symbologies the aiming illumination is usually turned off when an image is being acquired in order to ensure a constant illumination over the field of view. This may also improve power conservation. When reading 1D bar code symbols or some 2D bar codes on the other hand, conditions such as low ambient lighting, relatively large distances, and relatively poor quality of the indicia may favor leaving the aiming illumination on when the acquisition illumination is energized, effectively turning the aiming illumination into an auxiliary form of acquisition illumination in order to maximize the light reaching the target indicia.

The uniform illumination from one or more of the light sources may comprise, for example, an overall illuminated pattern that corresponds to the field of view of the indicia reading terminal 100. In one particular example, one of the light sources can be configured so that the overall pattern provided illuminates the corners of the field of view to a brightness of at least about 50% of the target areas maximum brightness. Randomization of the overall pattern such as by using microlenses can reduce the formation of "hot spots," which are concentrated areas of constant higher radiance illumination on the target area. Likewise diffusion of light in a direction generally transverse to the direction of light diffusion provided by, e.g., the microlenses, can cause the light to diverge in relation to one another at typical module to target reading distances (e.g., about 1 inch to 15 inches for common symbologies). Moreover, it will be appreciated that diffusion patterns of light generated by ones of the light sources can be substantially manipulated using various lensing techniques, which can be optimized and modified as desired to provide light coverage on the target. These modifications can be implemented as part of the manufacturing process, and/or as part of the construction of, e.g., the hand held device.

Figure 3:
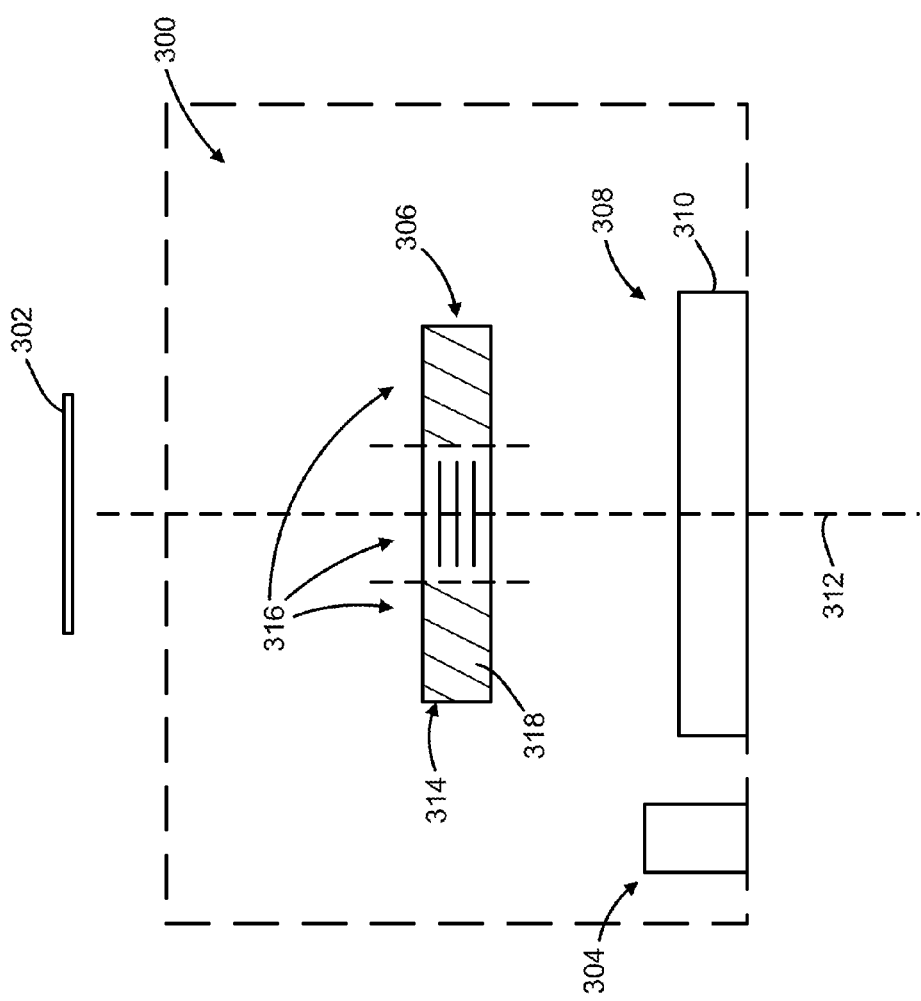
FIG. 3 is a diagram illustrating an exemplary functional indicia imaging unit comprising an excitation illumination module, a filter module, and an imaging module.

Referring now to FIG. 3, an exemplary arrangement of a functional indicia imaging unit 300 is illustrated as it might be used to image a decodable indicia 302. In the present example, it is seen that the functional indicia imaging unit 300 can comprise an excitation illumination module 304, a filter module 306, and an image sensor module 308 with an image sensor 310 defining an optical axis 312. The filter module 306 can be operatively positioned so that light reflecting from the decodable indicia 302 impinges on the filter module 306 before the light reaches the image sensor 310.

The filter module 306 can comprise an optical filter 314 with a plurality of filter regions 316, each of which can be configured to permit a certain wavelength (or range of wavelengths) to pass onto the image sensor module 308. Exemplary ranges can include, for example, wavelengths consistent with red, green, and orange visible light, or as defined by particular values of the pass-band wavelength such as 625 nm, 610 nm, and 510 nm, among others. The optical filter 314 can be constructed as a unitary structure made out of for example plastic (e.g., acrylic) that is treated and/or manufactured so as to include one or more of the filter regions 316. Other examples of the optical filter 314 can be constructed with a substrate 318, which has deposited thereon certain types of optical materials (e.g., optical coatings, optical films, optical layers), which are particularly selected so as to form the filter regions 316. In other embodiments of the present invention, these optical materials can be disposed on, or constructed as part of, the image sensor module 308 such as part of its lens assembly (not shown) or its image sensor 310. This configuration can be implemented, in one example, by disposing optical materials on pixels (and regions of pixels) found in the pixel array discussed in connection with the image sensor of FIG. 2.

In one implementation of the functional indicia imaging unit 300, actuators (e.g., a piezoelectric actuator) can be used to move the optical filter 314. These actuators can translate, rotate, oscillate, and otherwise act upon all or a portion of the optical filter 314 so as to locate the different filter regions 316 in a position to intercept the light reflected from the decodable indicia 302. One location, for example, may align individual ones of the filter regions 316 with the optical axis 312. Moreover, during operation of the terminal (e.g., indicia reading terminal 100 (FIG. 1)) it is contemplated that the selection of the filter regions 316 can be orchestrated as part of the decode process of the terminal device. This process may comprise a step for attempting to decode the decodable indicia 302 using one of the filter regions 316 and an illumination setting for the excitation illumination module 304. If the attempt fails, the process may also comprise a step for changing one or more of the filter regions 316 and the illumination setting and attempting to decode again. The process may end when a successful combination of the filter regions 316 and illumination settings permits the terminal device to successfully decode the decodable indicia 302.

Figure 4:
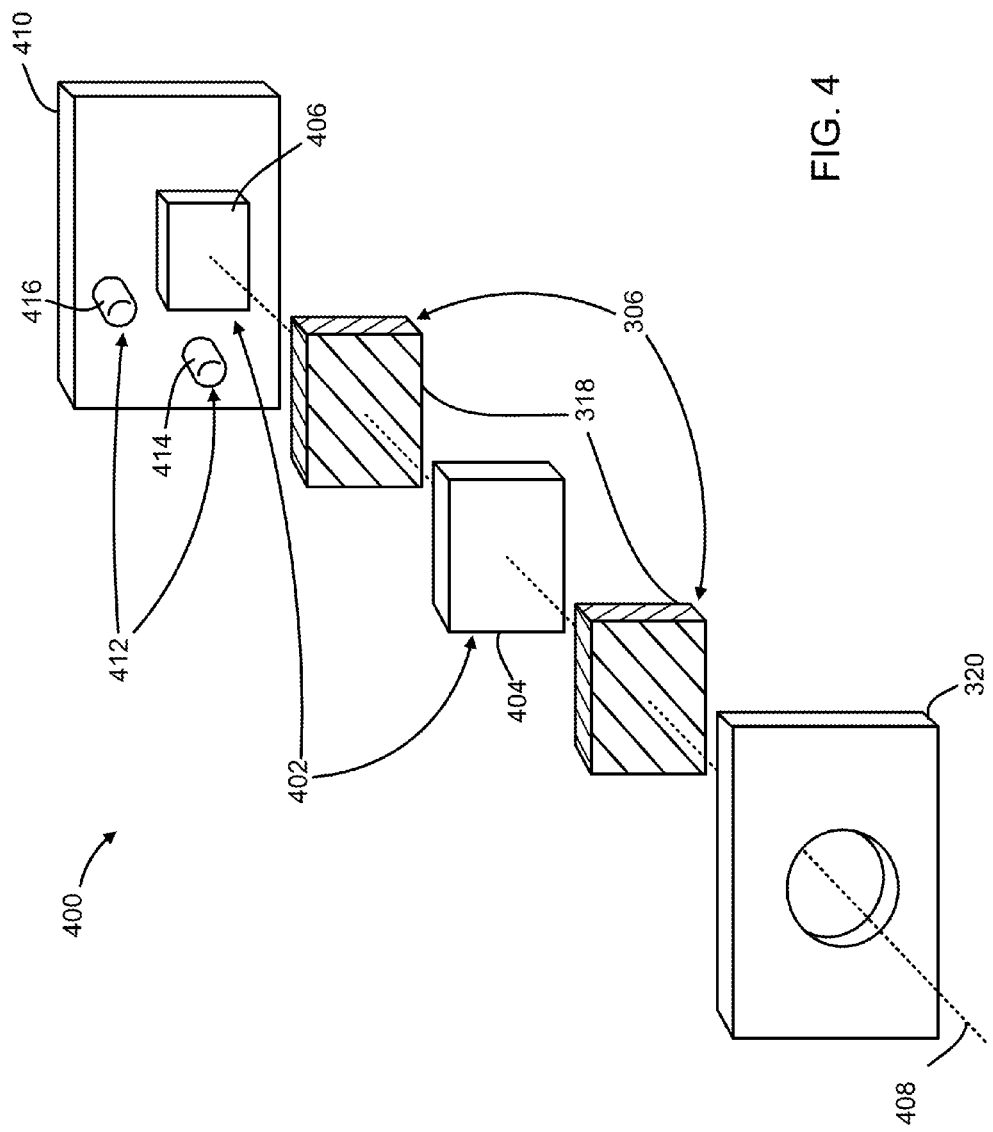
FIG. 4 is a perspective, exploded, assembly view of an example of an imaging module for use with, and comprising functional indicia imaging unit such as the functional indicia imaging unit of FIG. 3.
Figure 5:
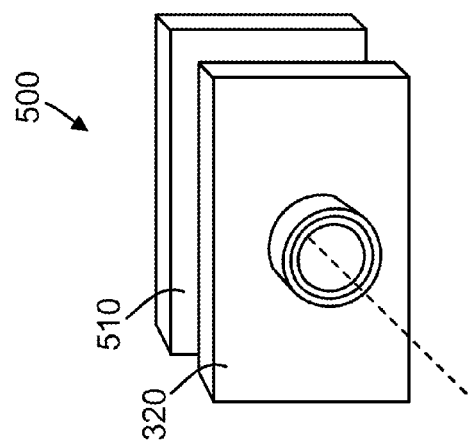
FIG. 5 is a perspective, assembled view of another example of an imaging module such as the imaging module of FIG. 4, for use with, and comprising functional indicia imaging unit such as the functional imaging unit of FIGS. 3 and 4.

It was noted above that each of the modules, and collectively the functional indicia imaging unit, can be incorporated into the imaging module for use in the indicia reading terminal. An example of an imaging module 400 is illustrated in FIGS. 4 and 5, and described in more detail below. In one embodiment, the imaging module 400 can comprise an image sensor module 402 comprising a lens assembly 404, and an image sensor 406 defining an optical axis 408. The image sensor 406 is disposed on a printed circuit board 410 together with an excitation illumination module 412, which can comprise one or more of an illumination pattern light source bank 414, and aiming pattern light source bank 416. Both of the pattern light source banks 414, 416 can be provided in this example as a single light source. The imaging module 400 can also comprise at least one filter module 418 that can be aligned with the optical axis 408. The imaging module 400 can further include an optical plate 420 that can have optics for shaping light from illumination pattern light source bank 414, and the aiming pattern light source bank 416 into predetermined patterns.

Figure 6:
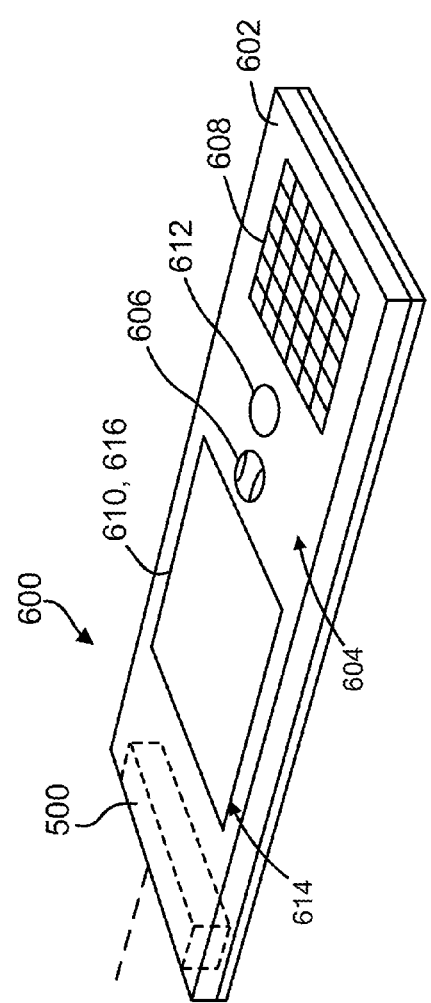
FIG. 6 is a perspective view of an indicia reading terminal incorporating an imaging module such as the imaging modules of FIGS. 4 and 5.

Imaging module 400 can be disposed in an indicia reading terminal 600, an example of which is shown in FIG. 6. The indicia reading terminal 600 can include a hand held housing 602 that supports a user input interface 604 with a pointer controller 606, a keyboard 608, a touch panel 610, and a trigger 612. The hand held housing 602 can also support a user output interface 614 with a display 616.

Exemplary devices that can be used for devices of the user input interface 604 are generally discussed immediately below. Each of these is implemented as part of, and often integrated into the hand held housing 602 so as to permit an operator to input one or more operator initiated commands. These commands may specify, and/or activate certain functions of the indicia reading terminal. They may also initiate certain ones of the applications, drivers, and other executable instructions so as to cause the indicia reading terminal 1000 to operate in an operating mode.

Devices that are used for the point controller 606 are generally configured so as to translate the operator initiated command into motion of a virtual pointer provided by a graphical user interface ("GUI") of the operating system of the indicia reading terminal 600. It can include devices such as a thumbwheel, a roller ball, and a touch pad. In some other configurations, the devices may also include a mouse, or other auxiliary device that is connected, e.g., via wire, or wireless communication technology, to the indicia reading terminal 600.

Implementation of the keyboard 608 can be provided using one or more buttons, which are presented to the operator on the hand held housing 602. The touch panel 610 may supplement, or replace the buttons of the keyboard 608. For example, one of the GUIs of the operating system may be configured to provide one or more virtual icons for display on, e.g., the display 616, or as part of another display device on, or connected to the indicia reading terminal 600. Such virtual icons (e.g., buttons, and slide bars) are configured so that the operator can select them, e.g., by pressing or selecting the virtual icon with a stylus (not shown) or a finger (not shown).

The virtual icons can also be used to implement the trigger 612. On the other hand, other devices for use as the trigger 612 may be supported within, or as part of the hand held housing 602. These include, but are not limited to, a button, a switch, or a similar type of actionable hardware that can be incorporated into the embodiments of the indicia reading terminal 600. These can be used to activate one or more of the devices of the portable data terminal, such as the bar code reader discussed below.

Displays of the type suited for use on the indicia reading terminal 600 are generally configured to display images, data, and GUIs associated with the operating system and/or software (and related applications) of the indicia reading terminal 600. The displays can include, but are not limited to, LCD displays, plasma displays, LED displays, among many others and combinations thereof. Although preferred construction of the indicia reading terminal 600 will include devices that display data (e.g., images, and text) in color, the display that is selected for the display 616 may also display this data in monochrome (e.g., black and white). It may also be desirable that the display 616 is configured to display the GUI, and in particular configurations of the indicia reading terminal 600 that display 616 may have an associated interactive overlay, like a touch screen overlay. This permits the display 616 to be used as part the GUI so as to permit the operator to interact with the virtual icons, the buttons, and other implements of the GUI to initiate the operator initiated commands, e.g., by pressing on the display 616 with the stylus (not shown) or finger (not shown).

The hand held housing 602 can be constructed so that it has a form, or "form factor" that can accommodate some, or all of the hardware and devices mentioned above, and discussed below. The form factor defines the overall configuration of the hand held housing 602. Suitable form factors that can be used for the hand held housing 602 include, but are not limited to, cell phones, mobile telephones, personal digital assistants ("PDA"), as well as other form factors that are sized and shaped to be held, cradled, and supported by the operator, e.g., in the operator's hand(s) as a gun-shaped device. One exemplary form factor is illustrated in the embodiment of the indicia reading terminal 600 that is illustrated in the present FIG. 6.

Figure 7:
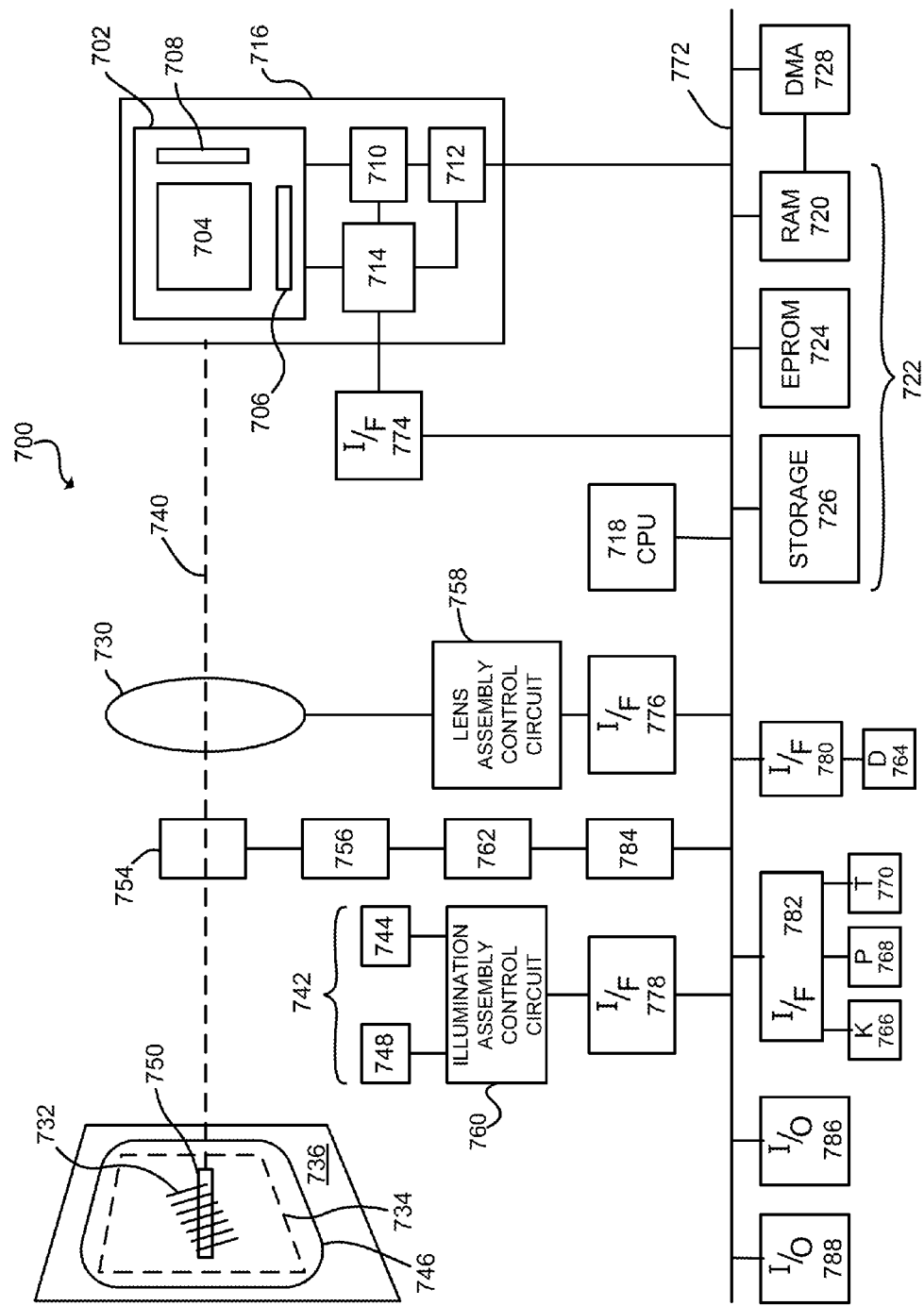
FIG. 7 is a block diagram of an exemplary hardware platform for implementation in an indicia reading terminal such as the indicia reading terminal of FIG. 6.

An exemplary hardware platform for use in, e.g., the indicia reading terminal 100, 600 is illustrated and described with reference to the schematic, block diagram of FIG. 7. In FIG. 7, it is seen that an indicia reading terminal 700 can include an image sensor 702 comprising a multiple pixel image sensor array 704 having pixels arranged in rows and columns of pixels, column circuitry 706, and row circuitry 708. Associated with the image sensor 702 can be amplifier circuitry 710, and an analog to digital converter 712 which converts image information in the form of analog signals read out of multiple pixel image sensor array 704 into image information in the form of digital signals. Image sensor 702 can also have an associated timing and control circuit 714 for use in controlling, e.g., the exposure period of image sensor 702, and/or gain applied to the amplifier 710. The noted circuit components 702, 710, 712, and 714 can be packaged into a common image sensor integrated circuit 716. In one example, image sensor integrated circuit 716 can be provided by an MT10V022 image sensor integrated circuit available from Micron Technology, Inc. In another example, image sensor integrated circuit 716 can incorporate a Bayer pattern filter. In such an embodiment, CPU 718 prior to subjecting a frame to further processing can interpolate pixel values intermediate of green pixel values for development of a monochrome frame of image data. In other embodiments, red, and/or blue pixel values can be utilized for the image data.

In the course of operation of the indicia reading terminal 700 image signals can be read out of image sensor 702, converted and stored into a system memory such as RAM 720. A memory 722 of indicia reading terminal 700 can include RAM 720, a nonvolatile memory such as EPROM 724, and a storage memory device 726 such as may be provided by a flash memory or a hard drive memory. In one embodiment, indicia reading terminal 700 can include CPU 718 which can be adapted to read out image data stored in memory 722 and subject such image data to various image processing algorithms. Indicia reading terminal 700 can include a direct memory access unit (DMA) 728 for routing image information read out from image sensor 702 that has been subject to conversion to RAM 720. In another embodiment, indicia reading terminal 700 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 702 and RAM 720 are within the scope and the spirit of the invention.

Referring to further aspects of indicia reading terminal 700, indicia reading terminal 700 can include an imaging lens assembly 730 for focusing an image of a decodable indicia 732 located within a field of view 734 on a substrate 736 onto image sensor 702. Imaging light rays can be transmitted about an optical axis 740. Indicia reading terminal 700 can also include an excitation illumination module 742 that comprises one or more of an illumination pattern light source bank 744 for generating an illumination pattern 746 substantially corresponding to the field of view 734 of indicia reading terminal 700, and an aiming pattern light source bank 748 for generating an aiming pattern 750 on substrate 736. In use, indicia reading terminal 700 can be oriented by an operator with respect to a substrate 736 that bears the decodable indicia 732 in such manner that aiming pattern 750 is projected on a decodable indicia 732. In the example of FIG. 7, the decodable indicia 732 is provided by a 1D bar code symbol. Decodable indicia could also be provided by 2D bar code symbols or optical character recognition (OCR) characters.

The indicia reading terminal 700 can further include a filter module 752 that comprises one or more optical filters 754, as well as in some embodiments an actuator assembly 756 that is coupled generally to the filter module 752 such as to the optical filters 754. The optical filters 754 can be located on either side of the lens assembly 730. Likewise, one or more of the optical filters 754 can be disposed on one or more surfaces of the lens assembly 730 and/or the image sensor 702.

Each of illumination pattern light source bank 744 and aiming pattern light source bank 748 can include one or more light sources. Lens assembly 730 can be controlled with use of lens assembly control circuit 758 and the excitation illumination module 742 comprising illumination pattern light source bank 744 and aiming pattern light source bank 748 can be controlled with use of illumination assembly control circuit 760. Filter module 752 can be controlled with use of a filter module control circuit 762, which can be coupled to the actuator assembly 756. Lens assembly control circuit 758 can send signals to lens assembly 730, e.g., for changing a focal length and/or a best focus distance of lens assembly 730. Illumination assembly control circuit 760 can send signals to illumination pattern light source bank 744, e.g., for changing a level of illumination output by illumination pattern light source bank 744.

Indicia reading terminal 700 can also include a number of peripheral devices such as display 764 for displaying such information as image frames captured with use of indicia reading terminal 700, keyboard 766, pointing device 768, and trigger 770 which may be used to make active signals for activating frame readout and/or certain decoding processes. Indicia reading terminal 700 can be adapted so that activation of trigger 770 activates one such signal and initiates a decode attempt of the decodable indicia 732. The activation of trigger 770 can also activate the actuator assembly 756 in manner that locates one of the filter regions (e.g., filter regions 316 (FIG. 3)) of the optical filters 754 along the optical axis 740. This function of the trigger 770 can coincide with changes to the illumination from the excitation illumination module 742.

Indicia reading terminal 700 can include various interface circuits for coupling several of the peripheral devices to system address/data bus (system bus) 772, for communication with CPU 718 also coupled to system bus 772. Indicia reading terminal 700 can include interface circuit 774 for coupling image sensor timing and control circuit 714 to system bus 772, interface circuit 776 for coupling the lens assembly control circuit 758 to system bus 772, interface circuit 778 for coupling the illumination assembly control circuit 760 to system bus 772, interface circuit 780 for coupling the display 764 to system bus 772, interface circuit 782 for coupling keyboard 766, pointing device 768, and trigger 770 to system bus 772, and interface circuit 784 for coupling the filter module control circuit 762 to system bus 772.

In a further aspect, indicia reading terminal 700 can include one or more I/O interfaces 786, 788 for providing communication with external devices (e.g., a cash register server, a store server, an inventory facility server, a indicia reading terminal 700, a local area network base station, a cellular base station). I/O interfaces 786, 788 can be interfaces of any combination of known computer interfaces, e.g., Ethernet (IEEE 802.3), USB, IEEE 802.11, Bluetooth, CDMA, and GSM.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

The invention claimed is:

1. A terminal, comprising:
   an illumination source for casting light onto a target, the cast light having
      a first wavelength in a non-visible spectrum that causes the target to emit light in a first visible wavelength, or
      a second wavelength different from the first wavelength, the second wavelength being in the non-visible spectrum that causes the target to emit light in a second visible wavelength different from the first visible wavelength;
   an optical filter comprising
      a first filter region having a pass-band matching the first visible wavelength of the light emitted by the target, and
      a second filter region having a pass-band matching the second visible wavelength of the light emitted by the target;
   an image sensor for generating a signal corresponding to light incident on the image sensor, the image sensor having an optical axis on which the optical filter is aligned;

wherein the terminal is configured for attempting to process a first image of the target using the first wavelength and the first filter region, and if processing is unsuccessful, attempting to process a second image of the target by changing the illumination source to the second wavelength and changing the optical filter to the second filter region.

2. The terminal of claim 1, comprising an actuator coupled to the optical filter for changing the wavelength of light that passes through the filter along the optical axis.

3. The terminal of claim 1, wherein the optical filter comprises a plurality of filter regions each having a pass-band for a different wavelength.

4. The terminal of claim 1, comprising an actuator coupled to the optical filter, wherein:
the optical filter comprises a plurality of filter regions each having a pass-band for a different wavelength;
the actuator moves the optical filter to place one of the filter regions into alignment with the optical axis; and
the filter region aligned with the optical axis is selected based on the wavelength of the light cast by the illumination source.

5. The terminal of claim 1, wherein the illumination source is configured for casting light at a plurality of wavelengths.

6. The terminal of claim 1, comprising an imaging lens for focusing light onto the image sensor.

7. The terminal of claim 1, comprising an imaging lens assembly optically coupled to the image sensor, wherein:
the optical filter comprises an optical coating on the imaging lens assembly;
the optical coating passes light in the visible wavelength emitted by the target.

8. The terminal of claim 1, wherein the optical filter blocks all wavelengths outside of the pass-band.

9. The terminal of claim 1, wherein:
the image sensor comprises a plurality of pixels; and
the optical filter comprises an optical coating on a pixel, the optical coating forming a filter region that passes light having a visible wavelength.

10. The terminal of claim 1, wherein;
the image sensor comprises a plurality of pixels; and
the optical filter comprises an optical coating on a plurality of pixels, wherein the optical coating forms a plurality of filter regions each having a pass-band for a different wavelength.

11. The terminal of claim 1, wherein the illumination source comprises:
a light emitting diode for generating a first light beam having a first wavelength for illuminating the target; and
a laser diode for generating a second light beam of laser light.

12. The terminal of claim 1, wherein the image sensor comprises a pixel array, the pixel array comprising color pixels and monochrome pixels, the color pixels being located at spaced apart positions on the pixel array among the monochrome pixels.

13. The terminal of claim 1, wherein the optical filter comprises a substrate having separate pass-bands for wavelengths corresponding to red light, green light, and orange light.

14. A terminal, comprising:
an illumination source for casting light onto a target, the cast light having
a first wavelength in a non-visible spectrum that causes the target to emit light in a first visible wavelength, or
a second wavelength different from the first wavelength, the second wavelength being in the non-visible spectrum that causes the target to emit light in a second visible wavelength different from the first visible wavelength;
an optical filter comprising a plurality of filter regions each having a pass-band for a different wavelength spectrum of visible light;
an image sensor for generating a signal corresponding to light incident on the image sensor, the image sensor having an optical axis on which the optical filter is aligned, the image sensor comprising a pixel array, the pixel array comprising color pixels and monochrome pixels, the color pixels being located at spaced apart positions on the pixel array among the monochrome pixels;
wherein the terminal is configured for attempting to process a first image of the target using the first wavelength and a first filter region of the plurality of filter regions, and if processing is unsuccessful, attempting to process a second image of the target by changing the illumination source to the second wavelength and changing the optical filter to a second filter region of the plurality of filter regions.

15. The terminal of claim 14, comprising an actuator coupled to the optical filter, wherein the actuator moves the optical filter to place one of the filter regions into alignment with the optical axis.

16. The terminal of claim 14, wherein the illumination source is configured for casting light at a plurality of wavelengths.

17. The terminal of claim 14, comprising an imaging lens for focusing light onto the image sensor.

18. The terminal of claim 14, comprising an imaging lens assembly optically coupled to the image sensor, wherein the optical filter comprises an optical coating on the imaging lens assembly.

19. The terminal of claim 14, wherein the optical filter comprises an optical coating on a portion of the pixel array, the optical coating forming a filter region that passes light having a visible wavelength.

20. The terminal of claim 14, wherein:
the image sensor comprises a plurality of pixels; and
the optical filter comprises an optical coating on a pixel, the optical coating forming a filter region that passes light having a visible wavelength.

21. The terminal of claim 14, wherein the illumination source comprises:
a light emitting diode for generating a first light beam having a first wavelength for illuminating the target; and
a laser diode for generating a second light beam of laser light.

22. The terminal of claim 14, wherein the optical filter comprises a substrate having separate pass-bands for wavelengths corresponding to red light, green light, and orange light.

23. A method comprising:
aligning an optical axis of an image sensor with a target that emits light in a visible wavelength in response to light in a non-visible wavelength spectrum;
illuminating the target with light having a wavelength in a non-visible wavelength spectrum; and setting (i) the wavelength of the light illuminating the target to correspond to the non-visible wavelength spectrum in response to which the target emits light in the visible wavelength and/or (ii) a pass-band of an optical filter aligned with the image sensor's optical axis to correspond to the visible wavelength in which the target emits light;

generating a signal corresponding to light incident on the image sensor by:

receiving a first trigger signal;

wherein the steps of illuminating and setting are performed in response to the first trigger signal;

in response to the first trigger signal, attempting to process a first image of the target based on the signal generated by the image sensor; and in response to a failed attempt to process the first image, setting (i) the wavelength of the light illuminating the target to a different wavelength than the previously set wavelength of light illuminating the target and/or (ii) a pass-band of an optical filter aligned with the image sensor's optical axis to correspond to a different wavelength than the previously set wavelength of the pass-band.

24. The method of claim 23, comprising aligning a filter region of the optical filter with the image sensor's optical axis.

25. The method of claim 23, wherein the optical filter comprises a plurality of filter regions each having a pass-band for a different wavelength, the method comprising:

selecting a filter region based on the wavelength of the light illuminating the target; and aligning the selected filter region with the image sensor's optical axis.

26. The method of claim 23, comprising receiving a first trigger signal, wherein the steps of illuminating and setting are performed in response to the first trigger signal.

* * * * *